March 12, 1940. G. A. KOWALSKI 2,193,103
FISHHOOK
Filed June 21, 1938
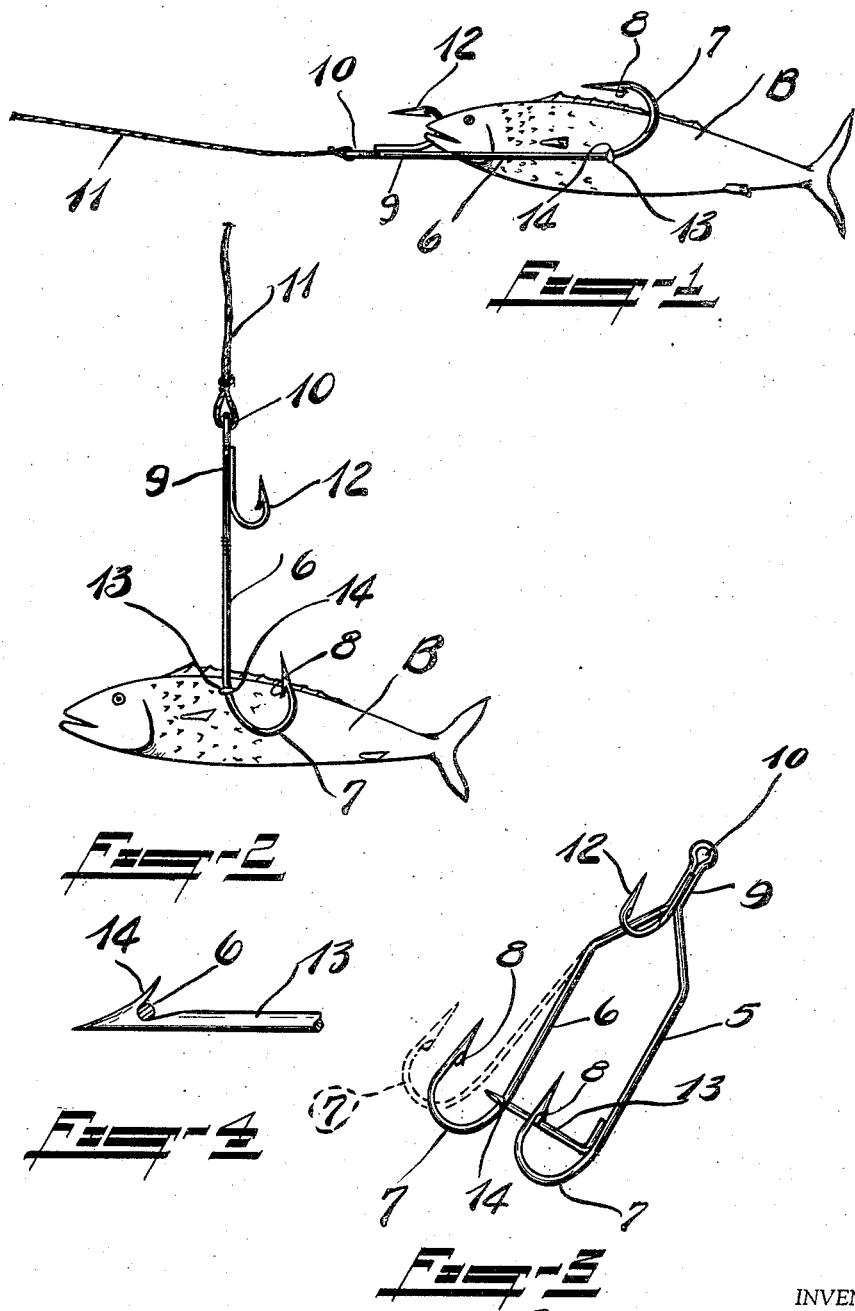
INVENTOR.
George A. Kowalski.
BY Frank C. Karman.
ATTORNEY.

Patented Mar. 12, 1940

2,193,103

UNITED STATES PATENT OFFICE 2,193,103

FISHHOOK

George A. Kowalski, Bay City, Mich.

Application June 21, 1938, Serial No. 214,904

2 Claims. (Cl. 43—40)

This invention relates to fishhooks, and more particularly to a fishhook which can be used for trolling, still fishing, or casting.

One of the prime objects of the invention is to design a fishhook by which live bait, such as for example, a minnow or frog may be firmly held without injury, and may have entire freedom of movement in the water so as to be attractive to the fish and thus facilitate the catching thereof.

Another object is to design a hook designed for use in such manner as to keep the bait in a natural position, and so that the fish will attempt to swallow the bait tail first and can be securely caught.

A further object is to provide a hook including spaced apart, twin shanks and provide an impaling pin on one of said shanks which cooperates with and detachably engages the opposite shank, so that the bait is locked on the hook and cannot become detached.

A still further object is to design a general purpose hook, which can be easily and economically manufactured and assembled.

With the above and other objects in view the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

Fig. 1 is a side elevational view of my improved fishhook showing a bait applied thereto and as used when trolling.

Fig. 2 is also a side elevational view showing the bait as attached for still fishing.

Fig. 3 is an enlarged perspective view showing my improved fishhook, the broken lines showing the one shank sprung to permit impaling a bait on the impaling pin.

Fig. 4 is a fragmentary part sectional view showing the manner of locking the impaling pin to the shank.

In the accompanying drawing and description, I have shown and I shall describe my invention applied to bait composed of a minnow or small fish, but it will be understood that it can be used on any other bait as desired.

My invention includes as a part of its combination, a pair of laterally spaced straight shanks 5 and 6 respectively, each having its lower end curved and shaped to form a hook 7 formed with a barbed end 8 as usual, the upper ends of said shanks converging and being welded, brazed or otherwise secured together as at 9 to form a neck, the end terminating in an eye 10 to which the line 11 is secured in the conventional manner. A lead hook 12 is also secured to this section 9, this hook being of conventional design and is utilized in a manner to be presently described.

An impaling pin 13 is formed integral with or can be secured to the shank 5 and is provided with a barb 14 as shown, which barb detachably engages the opposite shank 6 to hold the shanks in predetermined, spaced relation to prevent them turning with relation to each other, and to further impale the bait and lock it on the hook.

The spacing between the shanks 5 and 6 is such as to receive the live bait therebetween, and in Fig. 1 of the drawing I have shown this bait "B" attached to the hook for trolling, the lead hook 12 piercing the mouth of the minnow bait, while the impaling pin 13 passes through the body, this holds the bait in a natural position with the hooks 7 curving directly over the back of the bait, the fish naturally follows the bait when it is towed, and swallows the minnow tail first.

When casting the hook is baited in exactly the same manner.

For still fishing the bait is applied as indicated in Fig. 2 of the drawing, the lead hook being free, and the minnow being impaled at a point directly above the backbone. The minnow is not sensitive at the point through which the impaling pin extends and for all practical purposes it will serve as live bait for a considerable period of time and will swim around in a natural manner, it cannot become dislodged, because the barb 14 engages the shank 6.

When baiting, the shank 6 is sprung inwardly to disengage it from the brad 14, the shank then springs outwardly as clearly indicated in broken lines in Fig. 3 and if required, it is then further manually sprung to permit the impaling of the minnow B, after which the shanks are forced towards each other and the barb placed in engagement with the shank 6.

The device can be made in any desired manner, the shanks 5 and 6 being made up of a single piece of spring wire to which the lead hook and impaling pin is welded or brazed, or they can be made up of individual pieces welded or otherwise secured to make up the complete hook.

From the foregoing description, it will be obvious that I have perfected a very simple, practical and efficient all purpose hook for catching fish.

What I claim is:

1. A fishhook comprising a pair of spaced apart identically similar hook members each having a shank, the upper ends of which converge to form a neck including a line attaching eye, an impaling pin provided on one of said shanks at its mid-portion and formed with a barb on the free end thereof, said barb releasably engaging the opposite shank to form a catch and hold the hooks in proper spaced apart relation.

2. A fishhook comprising a pair of similar spaced apart individual hook members each having a shank, the upper ends of which are shaped to bring them closely together to form a neck which terminates in a line attaching eye, a hook secured on the neck portion, and a transversely disposed impaling pin formed integral with one of the first mentioned shanks and provided with a barb for releasably engaging the opposite shank and holding the hooks in predetermined spaced relation.

GEORGE A. KOWALSKI.